United States Patent [19]

Comroe et al.

[11] Patent Number: 5,040,238
[45] Date of Patent: Aug. 13, 1991

[54] TRUNKING SYSTEM COMMUNICATION RESOURCE REUSE METHOD

[75] Inventors: Richard A. Comroe, Dundee; Arun Sobti, Wheaton; Robert W. Furtaw, Arlington Heights, all of Ill.

[73] Assignee: Motorola, Inc., Schaumburg, Ill.

[21] Appl. No.: 546,325

[22] Filed: Jun. 29, 1990

[51] Int. Cl.⁵ .................. H04B 7/14; A04Q 7/00
[52] U.S. Cl. ........................... 455/33; 455/56; 455/67
[58] Field of Search ............ 455/33, 34, 56, 32, 455/67; 379/59, 60, 61

[56] References Cited

U.S. PATENT DOCUMENTS

| | | | |
|---|---|---|---|
| 4,573,206 | 2/1986 | Graud et al. | 455/56 |
| 4,578,815 | 3/1986 | Persinotti | 455/56 |
| 4,736,453 | 4/1988 | Schloemer | 455/56 |
| 4,850,033 | 7/1989 | Eizenhofer et al. | 455/56 |

*Primary Examiner*—Reinhard J. Eisenzopf
*Assistant Examiner*—Lisa Charouel
*Attorney, Agent, or Firm*—Joseph P. Krause

[57] ABSTRACT

Reusing radio frequency specta in a trunked radio system by establishing small cell trunked radio systems within a large cell trunked radio system wherein low power radio transmission occurs permits multiple small cell trunked radio systems in geographically separate locatiosn to use a limited number of radio resources simultaneously, increasing usage of a finite number of communication resources. As used in cellular telephone systems, very low power trunked radio systems separated from each other can reuse the same frequency without interfering with each other or interfering with a large cell trunked radio system license holder.

6 Claims, 2 Drawing Sheets

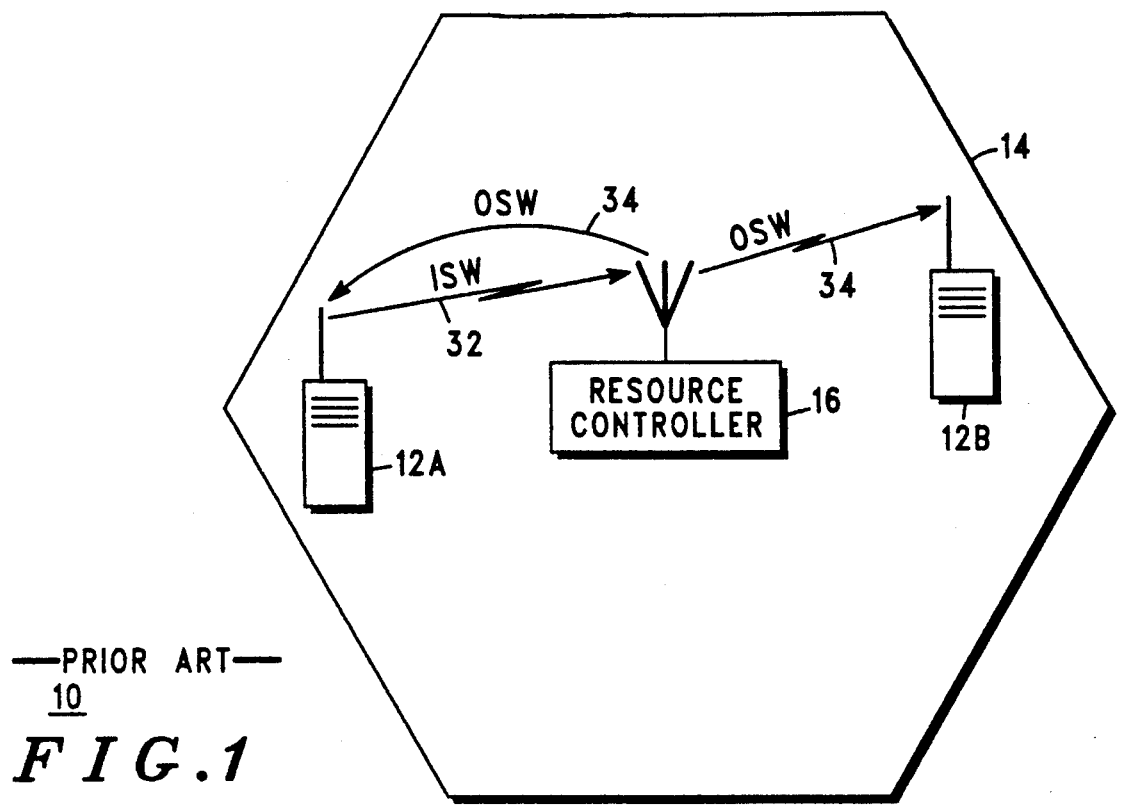
*FIG.1* —PRIOR ART—
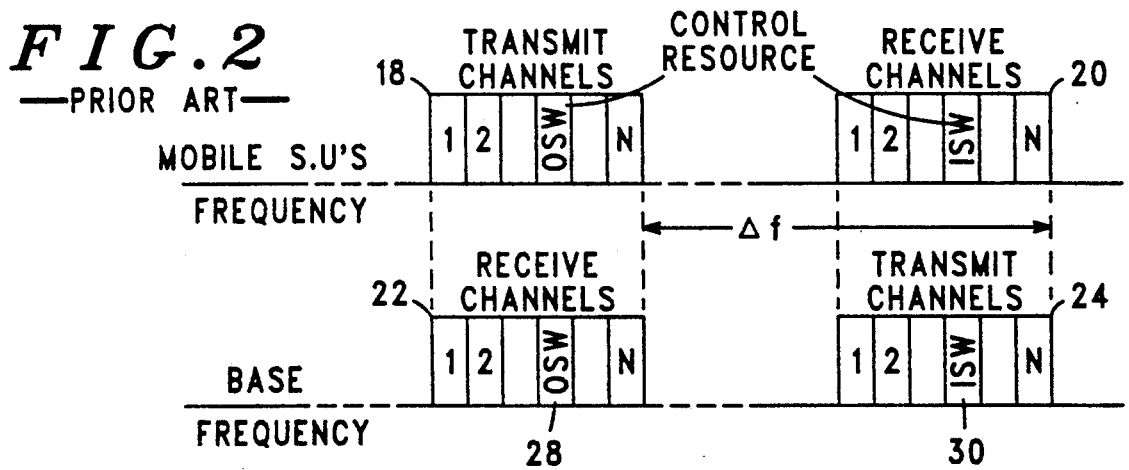
*FIG.2* —PRIOR ART—
*FIG.3* —PRIOR ART—
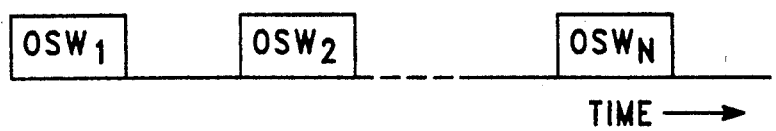
OSW FORMAT
*FIG.4* —PRIOR ART—

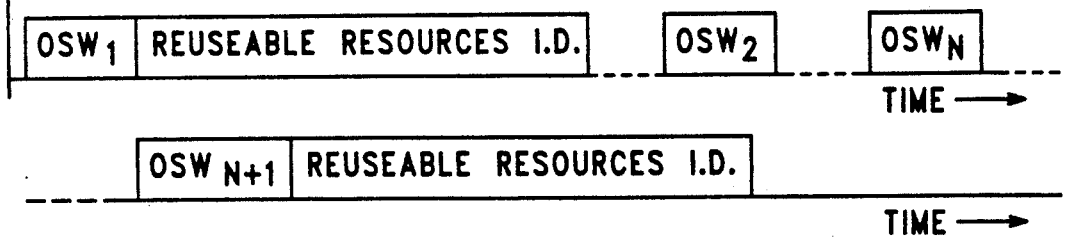
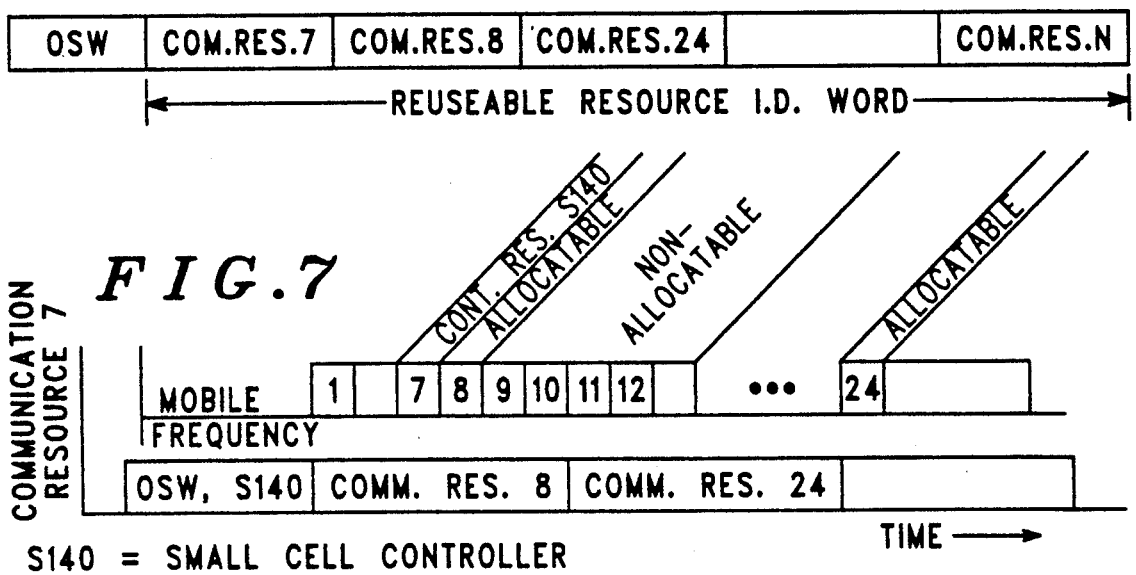
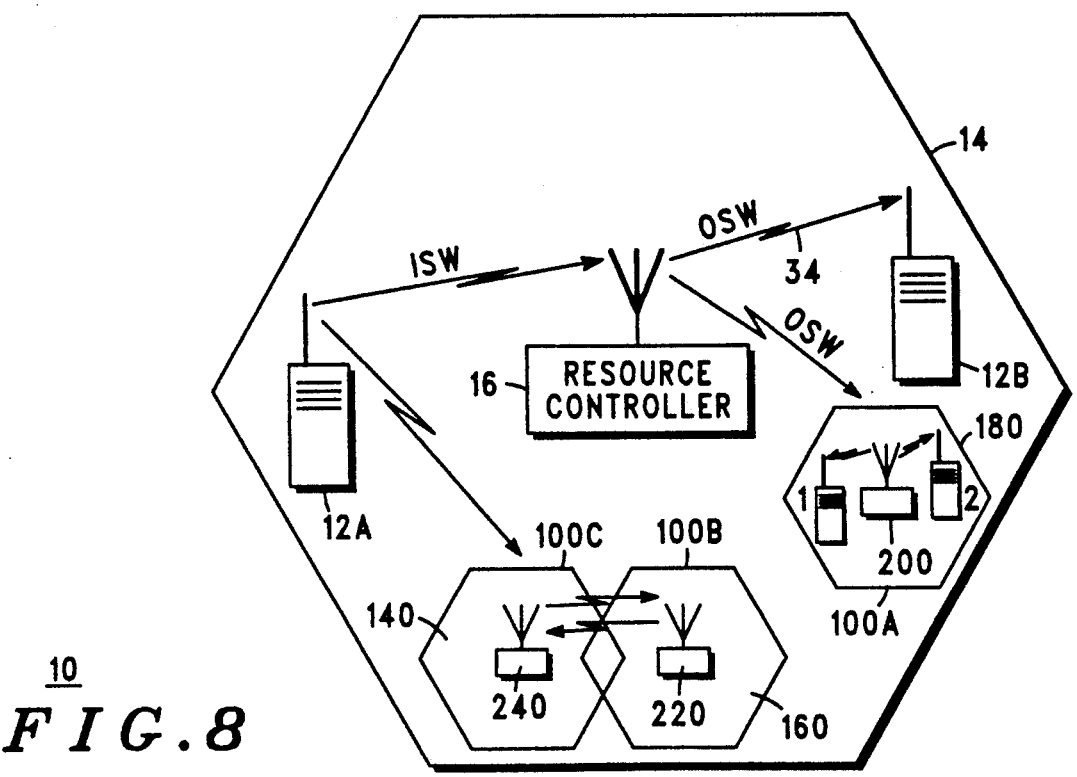

TRUNKING SYSTEM COMMUNICATION RESOURCE REUSE METHOD

BACKGROUND OF THE INVENTION

This invention relates to trunked radio systems. In particular, this invention relates to more efficient use of communication resources used by trunked radio systems.

A trunked radio system is a two-way radio system that allocates a limited number of communication resources, such as radio frequencies, or time slots in a time division multiplexed communication system etc., on a time-shared basis amongst many users throughout a limited geographic area. The users time-share these communications resources on an as-needed basis by the users requesting a central controller for the privilege of temporarily using a resource to communicate with other subscribers to the system. If a communications resource is available for use when a user request one, the controller grants the request to the requesting user by broadcasting a message on a control channel throughout the coverage area, (hereafter control resource) which the users monitor. This message, an Outbound Signalling Word, (OSW) instructs the trunked radio system users of the identity of the channel assigned to the requesting user. (Other users may also be instructed to tune to the channel to permit communication with them to occur.) The requesting user may thereafter communicate with either a specific other user with whom communication was requested or other group related users, depending upon instructions broadcast from the resource controller.

Most trunked radio systems in operation today, are licensed to provide service throughout a geographic area on discrete frequencies, or frequence ranges. A trunked radio system license usually grants the licensee the right to the exclusive use of these communication resources in the particular coverage area. Of the communication resources used by a trunking system most trunked radio systems actually allocate pairs of resources or channels, where each allocated resource is comprised of a pair channels. One channel of the pair of channels comprising a communication resource is used for subscriber units to transmit on, (also known as a subscriber unit talk-in channel which the system controller listens to). The other channel of the pair of channels comprising a communication resource is known as a repeater talk out channel, (which the subscriber units listen to). These paired subscriber talk-in channels and repeater talk out channels are considered communication resources, although both a talk-in channel and a talk-out channel might also be considered as communication resources.

It is well known that trunked radio system communication resources are frequently unused for substantial periods of time. When a communication resource licensed for trunked radio use is not being used by the trunked radio system the communication resource is effectively being wasted since any other use of the resource is precluded. A more efficient use of available frequency spectrum might permit re-use of the licensed frequencies (or channels, time slots, or other communication resources) within the geographic area such that subscribers in different regions of the coverage area could use a communication resource simultaneously without interfering with each other. Ideally, both talk-in and talk-out channels would be available for re-use.

Since the breadth of the coverage area of the trunked radio system is primarily dependent upon the signal level radiated by both the resource controller and the subscriber units, the coverage area of a trunked radio system can be controlled by controlling the power levels of transmitters for the resource controllers and the subscriber units. FIG. 1 shown a schematic diagram of a trunked radio system (10) that provides radio communications to subscriber units (12) within a geographic region (14). This geographic region, (also referred to as the coverage area) (14) is the distance over which signals from a resource controller (16) (which is the administrator for the trunked radio system) have a useable signal strength, i.e. a signal level sufficiently high such that information therein may be recovered. Subscriber units beyond the coverage area (14) may be unable to detect signals from the resource controller (16). Similarly, subscriber units beyond the coverage area (14) might be too far from the resource controller (16) to provide the resource controller (16) with useable signals of their own. Reduced power levels of subscribers within the coverage area (14) and providing distributed resource controllers, also at reduced power levels, might permit a coverage area (14) as shown in FIG. 1 to be simultaneously partitioned into secondary, small-cell trunking systems providing communications throughout much smaller geographic areas within the larger area (14). A trunked radio system that permits more efficient use of limited radio spectrum, allowing the spectrum to be re-used, would be an improvement over the prior art.

SUMMARY OF THE INVENTION

There is provided herein a method of coordinating communication resource reuse by small-cell trunking systems within a large cell trunking system. The small-cell trunking systems re-use the large-cell communication resources but over limited geographic areas by limiting the power of small-cell subscribers, small-cell repeaters/transmitters and small-cell resource controllers. Only large-cell resources which are not being used within the small-cell coverage area are used by a small cell trunking system. Using this method, communication resources for the large cell may be simultaneously reused by multiple users in multiple small cells, each small cell lying within different portions of the geographic region covered by the large cell trunked radio system.

The invention requires the resource controller for an existing, large-cell trunked radio system to provide to small-cell controllers, a list of communications resources useable within the large cell. (Communication resources to be reused within the large cell would of course include with the talk-in and talk-out channels of a communication resource. Although the large cell resource controller might not identify each talk-in and talk-out channel specifically, the large cell resource controller would provide the identity of the large cell communication resource, which the small-cell controllers would know were comprised of pairs of channels.) The large-cell controller would preferably broadcast the list of communication resources useable with the large cell with its outbound signalling words on the control resource for the large cell. Small cell trunking system resource controllers, established for each small cell, would monitor the control resource for the large cell for the list of communication resources from the large cell resource controller. The small cell resource controllers would then be able to identify the communications resources of the large cell from the large-cell broadcast.

When a first small cell resource controller identifies the communications resources of the large cell, it monitors each of the communication resources, including possibly both the talk-in and talk-out channels, for useable communications signals. Useable communication signals on a communication resource might originate from a subscriber unit for the large cell that is using the resource, from the controller or a repeater for the large cell, from other small cell trunked radio systems that have begun using a large cell resource and that is within signal range of the small cell controller as well as any other signal source using the communication resource. (Useable communications signals for radio trunked radio system, also referred to as useable signals, are radio signals of an amplitude sufficiently great that a receiver will be able to demodulate the information in the signal. In systems using different types of modulation or spectrum allocation, useable signals will have other characteristics. In most trunking systems, an FM signal of sufficient strength to be demodulated would be a useable signal.)

Useable communication signals on a communication resource, (either a talk-in channel, a talk-out channel, or both) indicate that the resource is in use. Communication resources of the large cell (those resources that are allocable by the large cell) upon which useable signals are detected (from any source, including another small cell on either a talk-in channel, a talk-out channel, or both) are designated by the small cell resource controller as in use and not reusable within the corresponding small cell trunked system by the small cell trunked system resource controller. Large cell communication resources (either a talk-in channel, a talk-out channel, or both) that have no useable communication signals detectable by the small cell controller are identified by that controller as re-useable by the small cell resource controller. (Talk-in channels, talk-out channels or both, are referred to hereafter as communication resources, unless noted otherwise.)

If any large-cell communication resources are re-useable, the small cell resource controller designates one re-useable communication resource, (a communication resource on the list broadcast from the large cell resource controller and not having any useable communication signals detectable by the small-cell controller) as the control resource for the small cell. The small cell controller also designates some predetermined number of re-useable communication resources as communication resources for the small cell trunking system. The small cell controller then broadcasts its own control resource signals on the re-useable communication resource it claimed for use within its small cell. The signals that the small cell resource controller broadcasts on its control resource include OSW's normally required in trunking systems but also include a list of the identity of the re-useable communication resources that the small cell controller has allocated for use within the small cell. (The small-cell controller's allocation of unused communication resource within its small cell does not preclude the large cell from simultaneously assigning a communication resource used by a small cell to a large cell subscriber.) The small cell resource controller repetitively tests at least the communication resources it allocates for its own small cell use for usage by either the large cell or another small cell that interferes with the small cells use. In the event the large cell controller assigns a communication resource to a large cell subscriber that a small cell has previously allocated to itself for its small cell use, the small cell controller might have to suspend its use of the communication resource if the large cell subscribers use of the resource (large cell subscriber transmission on the resource) interferes with the small-cells use. For example, signals from a large cell subscriber on the resource used within the small cell might overpower signals within the small cell originating from small cell users.)

Any second small cell resource controller will also monitor the control resource from the large cell and identify communication resources of the large cell. This second small cell controller will scan the communication resources on the list broadcast from the large cell controller for useable signals. (Like the first small-cell controller, the second small cell controller will test the communication resources for any useable signals, including signals from large-cell subscribers and from other small-cell controllers and other small-cell subscribers.) If the second small cell resource controller detects signals broadcast from the first small cell resource controller on the communication resource allocated by the first small-cell controller as its control resource, the second small-cell resource controller will monitor the small-cell control resource signal to learn what communication resources of the large cell trunked system the first small-cell trunked system has claimed for use within its small cell. The second small-cell controller will thereafter mark any communication resources claimed by other small cell resource controllers as unavailable for reuse within its small cell and pick a set of remaining communication resources for its own control resource and communication resources. The second small-cell controller will also mark communication resources having useable signals from subscribers (both large cell and small cell subscribers) as unavailable for reuse. The second small cell controller then broadcasts its own control resource signals, which include its list of communication resource claimed by it.

Subscriber units that operate within these small cells are low power subscriber units. Similarly, the resource controllers for these small cell systems also operate with low power. Lowering the power from the small cell subscribers and resource controllers limits the geographic coverage area and prevents the small cell signals from interfering with the large cell resource controller.

BRIEF DESCRIPTION OF THE DRAWINGS

FIG. 1 shows a schematic diagram of some of the elements of a prior art trunked radio system.

FIG. 2 shows a diagram of the radio frequency spectra of the communications resources used by the mobile and base units.

FIG. 3 shows a train of outbound signalling words from a resource controller.

FIG. 4 shows a typical format of an outbound signalling word from a resource controller.

FIG. 5 shows a diagram of an outbound signalling word with an appended list of reusable resources from a resource controller of the large cell trunk system.

FIG. 6 shows a typical reusable communication resource information packet format.

FIG. 7 shows a diagram of the reusable communications resources and their subsequent usage by a small cell trunk system.

FIG. 8 shows a large scale trunk system and the relative geographic coverage are of at least three small cell trunk systems.

DETAILED DESCRIPTION OF THE PREFERRED EMBODIMENT

Referring to FIG. 1, a trunked radio system (10) is shown that provides trunked radio communications to subscriber units substantially throughout a coverage area (14). A subscriber unit (12a) requesting communication with another subscriber unit (12b) will ordinarily send an inbound signalling word (ISW) to the resource controller (16) that informs the resource controller (16) of the first subscriber unit's (12a) request for communication with a related subscriber unit (12b). The resource controller (16) will assign an available communication resource to the subscriber units (12a) and (12b) using an outbound signalling word (34) (OSW) broadcast from the resource controller on the trunking system's control resource. The control resource is usually a pair of radio frequencies selected from a frequency range or spectrum on which control signals are broadcast from the resource controller to the subscriber units, i.e. the OSW's, and on which control signals are broadcast to the resource controller from the subscriber units, i.e. the ISW's. OSW's and ISW's will be sent and received on different frequencies, distinct from the transmit and receive channels which are communication resources. See FIG. 2.

Even after the resource controller (16) assigns a communication resource to the subscriber units (12a and 12b) unassigned communications resources may be available for reuse within the geographic coverage area (14). In the preferred embodiment of this invention, the resource controller considers all licensed communication resources as available for re-use and broadcasts a list of communication resources available within the trunked radio system with its OSW's. In a typical trunked radio system, the resource controller (16) broadcasts outbound signalling words as shown in FIG. 3. These outbound signalling words designated OWS1, OSWS2, ... OSW$_N$, have a predefined format such as the format shown in FIG. 4. OSW's will typically include three bit fields. The first bit field could be considered the talk group ID. The second bit field could be a user ID, and the third bit field might be a channel ID. The talk group ID in an outbound signalling word, identifies users in the same or related talk groups that should respond to the OWS. In this invention, the OSW's are periodically appended with a list of the communication resources available within the large cell trunking system (10). As shown in FIG. 5, OSW's from the resource controller are periodically appended with the data words that identify the communication resources useable within the trunking system (10). The list of available reusable communication resources may be appended on OSW's on an as-needed basis. Alternative embodiments would of course include, for example, appending communication resource IDs to every OSW.

FIG. 6 shows a prototype OSW with an appended list of communication resources reuseable within the large cell. Predefined bit fields following the OSW contain data that identifies the communications resources. (The actual data in the reuseable resource I.D. word could represent many quantities, including for example actual frequencies. It might include encoded characters or symbols representing certain frequencies, time slots, channels etc. that when decoded can identify communications resources available for re-use.)

Referring to FIG. 8, there is shown a large cell trunked radio system (10) that includes a large cell trunked radio system controller (16), and subscriber units (12b and 12a) which communicate with each other through the large cell trunk system. The large cell trunk system (10) includes three small cell trunked radio systems (100a, 100b, and 100c). One small cell trunked radio system (100a) includes at least two small cell subscribe units (1 and 2).

The small cell trunked radio systems being within the geographic coverage area (14) of the large cell trunk system will find themselves at times within range of radio signals originating from a large cell subscriber unit (12a) as shown. To prevent interference to small-cell subscribers from large cell subscribers, the small cells may use only communication resources of the large cell, not carrying signals within range of the small cell controller. If a large cell subscriber moves into or near the coverage area of the small cell, and if the large cell subscriber uses a communication resource that the small cell is using, the small cell controller will have to de-allocate its claim on the communication resource that the large cell subscriber is using. Due to the nature of typical communications on a trunking system, i.e. short message duration, the small cell controller might delay releasing its claim on a communication resource and instead wait for the end of a short duration. The small cell controller might wait ten seconds for example, thereafter re-check the communication resource for activity. If the resource is still used, the small cell controller could then release the resource.

To coordinate usage of communications resources by small cell trunked radio systems (100a, 100b, and 100c), each of the small cell trunked radio systems repetitively checks the large-cell communications resources for communications signals and adjusts their claims for a subset of the communications resources not having any detectable signal. One communication resource claimed by a small cell controller will serve as the control resource for the small cell, carrying OSW's and ISW's for the small cell. The identity of communication resources claimed by the small cell resource controller is announced to geographically adjacent small cells by the small cell broadcasting, on the communication resources it claimed for its control resource, a list of the identity of communication resources claimed by that controller. As small cell controllers release their claim on communication resources, the list of communication resources claimed by them should change accordingly.

Prior to claiming a communication resource each small cell resource controller for a small cell (200, 220, and 240) identifies the large cell communication resources and tests each for a useable signal or prior claim (by another small cell controller). (Useable communications signals, also referred to as useable signals, are signals of an amplitude sufficiently great than an FM receiver will be able to demodulate the information in the signal.) Communication resources that have no useable signals and not claimed by a small cell controller are considered as being unused by a small cell controller and subject to the small cell controllers claim for its use within the small cell. Stated alternatively, each small cell resource controller (200, 220, and 240) tests the large-cell communications resources for a control resource signal or other useable signal, that would indicate prior assignment, claim, or usage of the communication resource.

If a small cell controller (200, 220, and 240) does not detect a control resource signal, claim, or other signal from another small cell resource controller or other user, the small cell resource controller may claim at least one unallocated reusable communications resource as its own control resource and begin broadcasting its own outbound signalling words such as those shown in FIG. 8. The outbound signalling words shown in FIG. 7 include bit fields following the small cell outbound signalling words that inform other adjacent small cell resource controllers of the number and identity of communications resources that the small cell resource controller claims for its own exclusive use within its small cell coverage area (140, 160, and 180) for example.

In the preferred embodiment, the large cell resource controller would ordinarily broadcast a list of reusable communication resources on its own control resource as described above. An alternate embodiment would include transferring the list of reusable communication resources to the small cell resource controllers (200, 220 and 240) by a wire-line, such as the telephone network.

Since the available communication resources of the large-cell may change over time, the small cells should periodically check the list of available communication resources that are available to the small cells for communication signals. The steps of the method shown in FIG. 10 should be repeated.

Upon finding a large cell control resource, the small cell resource controller tabulates the identity of communication resources designated as useable by the large cell controller. Each small cell controller then scans the communication resources for any signals that indicate that the communication resource is in use and thereby unavailable for re-use by the small cell.

If a signal is detected on a communication resource, the detecting small cell controller should monitor that detected small cell control resource to determine if the signal is from a small cell control resource and tabulate from the small cell control resource the identity of communication resources allocated by that small cell controller to itself. Remaining available communication resources can be used by the small cell controller as its own control resource and assignable or reusable communications resources.

Implementation of a small cell trunking system within a large cell trunking system would require much of the infrastructure found in a large cell trunking system albeit adapted for small geographic areas. A resource controller for the small cell would typically include a base site at which a radio receiver detects RF signals on which the ISW's are carried. The resource controller would also include a radio transmitter to broadcast the OSW's. A computer coupled to the receiver and transmitter would keep track of assignments of communication resources as well as the list of available communication resources. The computer would likely administer other tasks as well.

The small cell trunking system might include repeater stations, such as those shown in FIG. 1 and well known in the art, for the reception and distribution of signals throughout the coverage area of the small cell. Small cell subscriber units within the small cell would of course have to be able to detect control signals (OSW's) from the small cell control resource on any large cell communication resource. The small cell subscribers would also have to generate ISW's accordingly. The repeaters are typically coupled to the resource controller so that the resource controller knows of the use and non-use of a communication resource.

Transmitters used within the small cell (including subscriber unit transmitters, resource controller transmitters and repeaters) will typically have low output power levels, ten milliwatts for example. Increasingly high output power levels will expand the coverage area of the small cells.

What is claimed is:

1. In a large-cell trunked radio system providing radio communications to first subscriber units throughout a large geographic region, said large-cell trunked system having a resource controller for said large cell, a predetermined number of communication resources allocable to subscriber units within said large region by said resource controller using a control resource, where said large-cell trunked radio system includes a plurality of small-cell trunked systems each of which provides trunked radio communications to second subscriber units located within small geographic regions within said large region and where each said small-cell system has a small-cell system resource controller that allocates communication resources to subscriber units within said small-cell using at least one communication resource as a small-cell control resource, a method of coordinating use of a re-useable communication resources between small-cell trunked systems, such that re-use of communication resources by said small-cell trunked systems is compatible with the use of communication resources by said large-cell trunked system and with other small-cell trunked systems, said method comprised of the steps of:
   a) providing a list of communication resources to said small-cell resource controllers;
   b) within a fist small cell region, testing said communication resources for useable communication signals, including at least useable control resource signals from other small-cell resource controllers;
   c) testing useable control resource signals from other small-cell controllers for the identity of communication resources claimed by a small-cell resource controller for use within the corresponding small cell;
   d) identifying and claiming an unclaimed and unused communication resource as a control resource for said first small-cell controller; and
   e) using said claimed control resource for said first small cell, said first small-cell controller broadcasting a list of the identity of at least a subset of said communication resources unclaimed and unused as communication resources claimed by the corresponding first small cell.

2. The method of claim 1 where the step of providing a list of communication resources includes the step of:
   broadcasting said list of communication resources to small-cell resource controllers on said control resource for said large-cell trunked radio system.

3. The method of claim 1 where the step of providing a list of communication resources includes the step of:
   transferring information comprising said list of communication resources to small-cell resource controllers using a telephone network.

4. The method of claim 1 where the step of testing communication resources on said list for useable control resource signals includes:

monitoring said communication resources for radio signals having a predetermined minimum signal amplitude; and detecting predetermined control resource messages on said communication resources.

5. The method of claim 1 including the step of:

f) periodically repeating steps a) through e) to detect changes in the list of communication resources available for use by said small cells.

6. The method of claim 5 further including the steps of:

identifying communication resources previously claimed by said first small cell controller, as being used by another user;

modifying said list of the identity of communication resources claimed by said first small cell to delete communication resources being used by another user; and re-broadcasting said list.

* * * * *

UNITED STATES PATENT AND TRADEMARK OFFICE
CERTIFICATE OF CORRECTION

PATENT NO. : 5,040,238

DATED : AUGUST 13, 1991

INVENTOR(S) : RICHARD ALAN COMROE ET AL.

It is certified that error appears in the above-identified patent and that said Letters Patent is hereby corrected as shown below:

Column 8, line 29, claim 1, "a" between of and re-useable should be deleted.

Column 8, line 37, claim 1, "fist" should be first.

In the abstract, line 6, "locatiosn" should be locations.

Signed and Sealed this

Twenty-second Day of December, 1992

Attest:

DOUGLAS B. COMER

*Attesting Officer*  *Acting Commissioner of Patents and Trademarks*